United States Patent

Salvatore

(10) Patent No.: US 7,283,338 B2
(45) Date of Patent: Oct. 16, 2007

(54) POWER SUPPLY DEVICE FOR LOW-VOLTAGE ELECTRONIC RESIDUAL CURRENT CIRCUIT BREAKERS

(75) Inventor: Brandonisio Salvatore, Milan (IT)

(73) Assignee: ABB Service S.r.l. (IT)

( * ) Notice: Subject to any disclaimer, the term of this patent is extended or adjusted under 35 U.S.C. 154(b) by 71 days.

(21) Appl. No.: 10/343,051

(22) PCT Filed: Jul. 25, 2001

(86) PCT No.: PCT/EP01/08633

§ 371 (c)(1),
(2), (4) Date: Mar. 14, 2003

(87) PCT Pub. No.: WO02/13350

PCT Pub. Date: Feb. 14, 2002

(65) Prior Publication Data

US 2003/0161165 A1    Aug. 28, 2003

(30) Foreign Application Priority Data

Aug. 3, 2000  (IT)  ............................ MI2000A1812

(51) Int. Cl.
    *H02H 3/22* (2006.01)
(52) U.S. Cl. ......................................... 361/18; 361/111
(58) Field of Classification Search ................. 361/18,
    361/86, 87, 90, 91.1, 91.2, 91.7, 91.8, 92,
    361/93.9, 111, 118; 323/288; 363/45
    See application file for complete search history.

(56) References Cited

U.S. PATENT DOCUMENTS

| | | | |
|---|---|---|---|
| 4,346,342 A * | 8/1982 | Carollo | 323/276 |
| 4,682,266 A * | 7/1987 | Huynh et al. | 361/235 |
| 4,683,415 A * | 7/1987 | Zimmerman | 323/282 |
| 5,307,257 A * | 4/1994 | Fukushima | 363/53 |
| 5,371,667 A * | 12/1994 | Nakao et al. | 363/124 |
| 5,510,945 A | 4/1996 | Taylor et al. | |
| 5,625,275 A * | 4/1997 | Tanikawa et al. | 320/160 |
| 5,677,558 A * | 10/1997 | McGlinchey | 257/370 |
| 6,222,356 B1 * | 4/2001 | Taghizadeh-Kaschani | 323/288 |
| 6,473,284 B1 * | 10/2002 | Ilic et al. | 361/91.1 |

FOREIGN PATENT DOCUMENTS

| | | |
|---|---|---|
| DE | 197 35 743 | 2/1999 |
| WO | 98/13918 | 4/1998 |

* cited by examiner

*Primary Examiner*—Stephen W. Jackson
*Assistant Examiner*—Danny Nguyen
(74) *Attorney, Agent, or Firm*—Connolly Bove Lodge & Hutz, LLP; Larry J. Hume

(57) ABSTRACT

A power supply device for low-voltage electronic residual current circuit breakers includes an electronic rectifier stage suitable to receive in input a mains voltage and to generate a first unipolar voltage whose value depends on the value of the mains voltage, and an electronic adjustment stage, suitable to receive in input the first unipolar voltage and a current and to generate in output a second unipolar voltage of adjustable value. The electronic adjustment stage performs an active adjustment of the current input to the electronic adjustment stage so as to keep the second unipolar voltage at a predefined constant value.

9 Claims, 3 Drawing Sheets

POWER SUPPLY DEVICE FOR
LOW-VOLTAGE ELECTRONIC RESIDUAL
CURRENT CIRCUIT BREAKERS

BACKGROUND

The present invention relates to a power supply device for low-voltage electronic residual current circuit breakers (RC-CBs) and the like.

In particular, the power supply device, according to the present invention, is suitable for use in electronic RCCBs for applications of the single-phase or multiple-phase (two-phase, three-phase, et cetera) with operating voltages around 1000 V or less.

Many examples of low-voltage electronic RCCBs are known in the background art.

The structure of a low-voltage electronic RCCB of the known type is illustrated schematically with reference to FIG. 1.

In general, a low-voltage electronic RCCB, designated by the reference numeral 1, comprises a sensor 2, which is suitable to generate a signal 3, indicative of the presence of an imbalance current due to a ground-fault, in an electrical network 4 of the single- or multi-phase type.

The signal 3 is received in input by an electronic protection system 5, which generates control signals 6 in order to drive, for example, an electromagnetic release device and/or electronic signaling devices or auxiliary electronic devices (reference 8), aimed at providing signals related to the status of the apparatus or circuit breaker.

The electronic protection system 5, the electromagnetic release 7 and the signaling devices 8 must, for their correct operation, be supplied with a given electrical power level $P_{AL}$, generally provided by an electronic power supply device 9, which has in output a power supply voltage $V_{AL}$.

Traditionally, the electronic power supply device 9 can be realized according to different approaches.

According to a first constructive approach, the electronic power supply device 9 is structured, so as to receive electrical power (dashed arrow 10) directly from the sensor 2, which is used to detect the vector imbalance of the currents, between the phases of the electrical network 4. This type of approach, which offers the unquestionable advantage of ensuring power supply (and consequently operation of the RCCB) in a manner virtually independent of the mains voltage, has considerable drawbacks. In fact, the electrical power $P_{AL}$ that can be made available by the power supply device 9 is generally reduced (a few hundred mVA) and allows to supply an electronic protection system 5 or an electromagnetic release 7, which have to be necessarily of the low-power type. It also becomes difficult to supply power to other devices, which are accessories or are of the auxiliary type. Thus, one can say that the power supply devices 9, provided according to the first type of approach described, are often affected by considerable operating limitations.

In an alternative constructive approach, the electronic power supply device 9 is structured so as to obtain electric power (dashed arrow 11) directly from the electrical network 4. In order to be able to supply the electric power $P_{AL}$, voltages and currents ($V_{IN}$ and $I_{IN}$) of the phases of the electric network 4 are made available by means of a rectifier bridge and an appropriate network of resistive and capacitive passive elements (not shown). A network of passive elements of the nonlinear type 12 is generally used in order to widen the available range of the input supply voltage.

Practice has shown that also this constructive approach has considerable drawbacks, even though it is inherently very robust and capable of costantly supplying an adequate power level $P_{AL}$.

The use of a network of passive elements makes it difficult to ensure that a stable power supply condition is reached with a low transient period, when supply voltage ranges very different from each other have to be adopted.

Furthermore, in this case, it is necessary to dissipate as heat the excess available energy for the higher supply voltage ranges.

Moreover, the use of nonlinear passive components is very often critical, since these components generally have relatively large size and considerably high costs, in comparison with the costs of commonly used active or passive circuit elements.

Additionally, owing to the need to optimize the working point of the electrical network of passive elements, according to the supplied electric power, it is often necessary to provide a different type of power supply device 9 for each different supply voltage range, which has to be supplied.

For these reasons, the practice has shown that, often, the use of power supply devices of this type is scarcely flexible, leading to a consequent increase in production costs, installation costs and operating costs of the electronic RCCB.

SUMMARY OF THE INVENTION

The aim of the present invention is to provide a power supply device for low-voltage electronic RCCBs, which allows obviating the drawbacks above described.

Within the scope of this aim, an object of the present invention is to provide a power supply device for low-voltage electronic RCCBs, which allows using relatively high input supply voltage ranges while maintaining dissipated power at relatively low levels.

Another object of the present invention is to provide a power supply device for low-voltage electronic RCCBs, which allows providing an electric power sufficient to supply even relatively high-power electromagnetic release devices.

Another object of the present invention is to provide a power supply device for low-voltage electronic RCCBs, which has a reduced transient time before achieving the steady-state condition.

Another object of the present invention is to provide a power supply device for low-voltage electronic RCCBs, which is relatively compact, easy to manufacture and at relatively low costs.

Thus, the present invention provides a power supply device for low-voltage electronic RCCBs, comprising:
  an electronic rectifier stage, suitable to receive in input a mains voltage and to generate a first unipolar voltage, the value of said first unipolar voltage depending on the value of said mains voltage; and
  an electronic adjustment stage, suitable to receive in input, from said electronic rectifier stage, said first unipolar voltage and a first current and to generate in output a second unipolar voltage of adjustable value.

The power supply device, according to the present invention, is characterized in that said electronic adjustment stage comprises first electronic means, suitable to perform an active adjustment of said first current, so as to keep said second unipolar voltage at a predefined adjustable value.

The active adjustment of said first current, in input to said electronic adjustment stage, allows to obtain an output voltage, which can be easily predefined at a chosen value, considerably increasing the operating flexibility of the power supply device, according to the invention. The term "active adjustment" of said first current is used to designate a type of adjustment, which allows to vary the flow of said first current, by using active semiconductor devices. In this manner, the power supply device, according to the present invention, allows to convert a variable mains voltage into a power supply voltage, which can have a predefined adjustable value, preferably constant.

The active adjustment of said first current furthermore allows to reduce power dissipation to negligible values, by means of choosing the most appropriate adjustment modes, such as for example a nonlinear adjustment mode of the switching type, in which the flow of said first current is varied according to an ON/OFF mode.

BRIEF DESCRIPTION OF THE DRAWINGS

Further characteristics and advantages of the power supply device, according to the present invention, are described in greater detail hereinafter with particular reference to the accompanying drawings, wherein.

DETAIL DESCRIPTION

Figure 1:
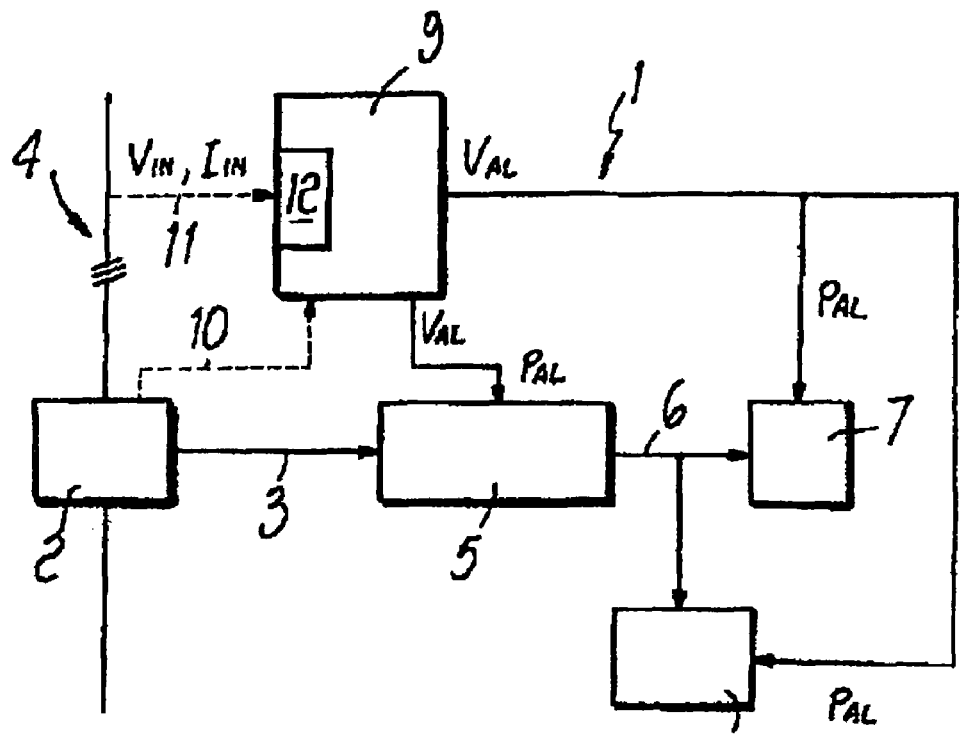
FIG. 1 is a schematic view of a low-voltage electronic RCCBs, of a known type.
Figure 2:
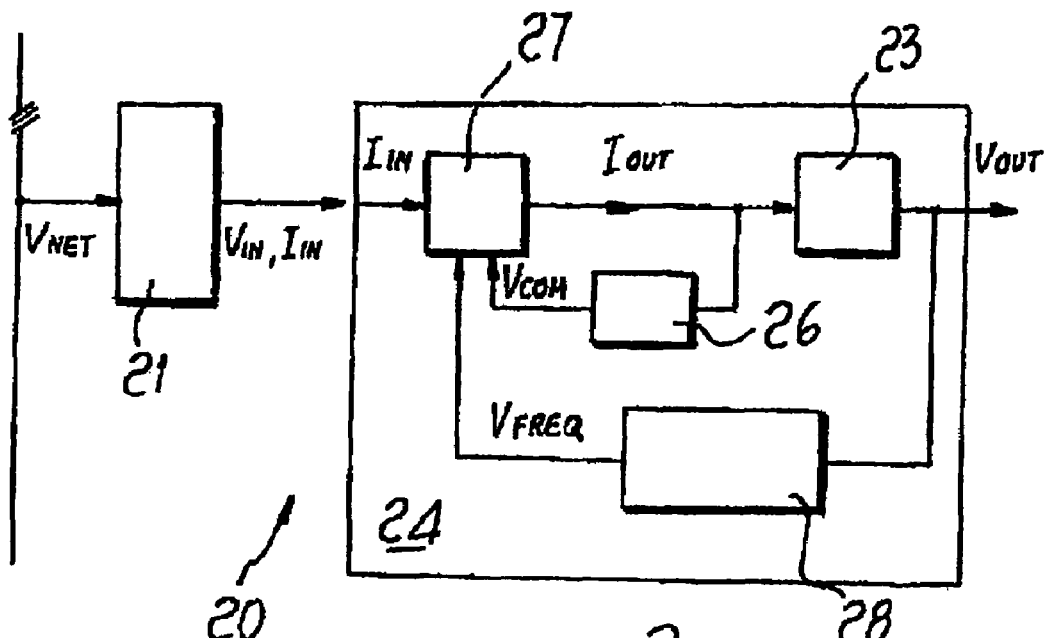
FIG. 2 is a schematic view of a power supply device, according to the present invention.

With reference to FIG. 2, the power supply device, according to the present invention, generally designated by the reference numeral 20, comprises an electronic rectifier stage 21. The electronic rectifier stage 21 receives in input a mains voltage $V_{NET}$ and generates a first unipolar voltage $V_{IN}$, whose value depends on the value of the mains voltage $V_{NET}$. Advantageously, the electronic rectifier stage 21 may comprise a diode bridge, connected so as to obtain a unipolar voltage, which is not necessarily constant. In fact, the first unipolar voltage $V_{IN}$ can comprise, for example, a waveform, which varies according to the modulus of one of the phase voltages. Obviously, depending on the available type of mains, the electronic rectifier stage can be adapted to draw voltage from a single-phase or multiple-phase mains. The power supply device 20 furthermore comprises an electronic adjustment stage 24, which is suitable to receive in input the first unipolar voltage $V_{IN}$ and a first current $I_{IN}$. The electronic adjustment stage 24 generates in output a second unipolar voltage $V_{OUT}$, having an adjustable value (for example an adjustable instantaneous values or an adjustable average value or the like). The second output voltage $V_{OUT}$ constitutes, in practice, the supply voltage, which is provided in output by the power supply device 20.

The power supply device 20 comprises first electronic means 27 in order to perform an active adjustment of the first current $I_{IN}$ in input to the electronic adjustment stage 24, so as to keep the second unipolar voltage $V_{OUT}$ at a predefined constant value.

The first electronic means 27 perform an active adjustment of the first current $I_{IN}$ in input to the electronic adjustment stage 24. This allows providing, in output from the first electronic means 27, a second current $I_{OUT}$, which has an adjustable average value.

Preferably, the first electronic means 27 perform an active adjustment of the first current $I_{IN}$, according to a nonlinear adjustment mode and particularly according to a switching-type adjustment mode. In particular, the first current $I_{IN}$ is preferably varied according to an ON/OFF mode. In this case, the second current $I_{OUT}$ can therefore have a pulsed-type waveform with an easily adjustable pulse width and repetition period.

Again with reference to FIG. 2, the electronic adjustment stage 24 advantageously comprises a charge accumulation circuit 23, which is electrically connected to the first electronic means 27. The charge accumulation circuit 23 receives in input the second current $I_{OUT}$ and generates in output the second unipolar voltage $V_{OUT}$. Thus, the value of the second unipolar voltage $V_{OUT}$ is adjustable, according to the average value of the second current $I_{OUT}$.

Preferably, the electronic adjustment stage 24 comprises second electronic means 26, which are electrically connected to the first electronic means 27 and generate control signals $V_{COM}$ in order to keep the second current $I_{OUT}$ below a predefined maximum threshold. In particular, the second electronic means 26 are suitable to limit the amplitude of the pulses of the second current $I_{OUT}$. In this manner, sudden variations of the voltage $V_{IN}$, caused by sudden changes in the mains voltage, are prevented from causing high current pulses of the current $I_{OUT}$, which may happen since the second current $I_{OUT}$ trends intrinsically to charge, in the shortest possible time, the charge accumulation circuit 23. This fact implies that in the power supply device 20, the voltage $V_{OUT}$ remains at a substantially constant value despite the occurrence of sudden mains voltage variations. This is particularly advantageous, since it prevents the possibility of damage to the electronic components connected downstream the power supply device 20.

Preferably, the electronic adjustment stage 24 comprises third electronic means 28, which are electrically connected to the first electronic means 27 and are suitable to increase the stability of the adjustment stage 24. Advantageously, the third electronic means 28 send a feedback signal $V_{FREQ}$ to the first electronic means 27 in order to adjust the slope of the rising/falling edges related to the pulses of the second current $I_{OUT}$. In this manner it is possible to reduce the onset of electromagnetic noise.

Figure 3:
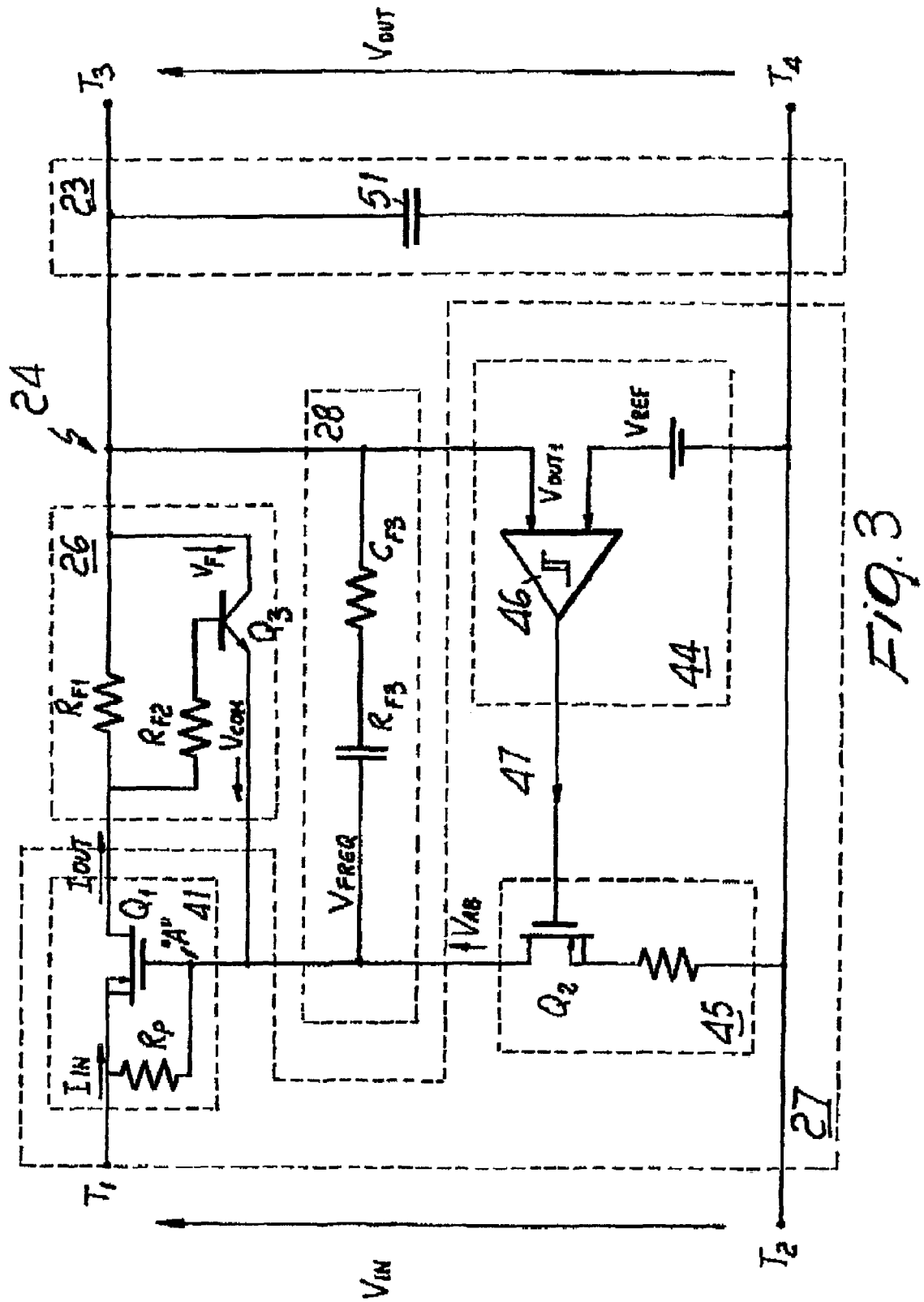
FIG. 3 is a schematic view of a preferred embodiment of a power supply device, according to the present invention.

A preferred embodiment of the electronic adjustment stage 24, regarding the power supply device 20, according to the invention, is now described schematically with reference also to FIG. 3.

According to this embodiment, the first electronic means 27 comprise an electronic interruption circuit 41, which is advantageously suitable to enable/interrupt, following the reception of an enable/disable signal $V_{AB}$, the first current $I_{IN}$, in input to the adjustment stage 24. Advantageously, the first electronic means 27 also comprise an electronic control circuit, which comprises a comparator circuit block 44 and an enabling circuit block 45. The comparator circuit block 44 is suitable to generate a control signal 47 if the voltage $V_{OUT}$ assumes values below or above a predefined range. The enabling circuit block 45 is suitable to generate, following the reception of the control signal 47, an enable/disable signal $V_{AB}$ for the electronic interruption circuit 41.

Advantageously, the electronic interruption circuit 41 comprises one or more active electronic semiconductor devices $Q_1$, such as for example transistors of the MOSFET, BJT or IGBT types active electronic semiconductor devices $Q_1$ can be connected, for example by means of an appropriate bias network schematically represented by the element $R_P$, at the input terminal of the electronic adjustment stage 24 which is assumed to have a voltage potential which is positive (terminal $T_1$) or equal to zero (terminal $T_2$). The chosen type of connection is important for the choice of the active semiconductor devices $Q_1$ comprised within the electronic interruption circuit 41. For example, if the connection occurs at the terminal $T_1$, the electronic interruption circuit 41 can include MOSFET transistors of the N type or BJT transistors of the NPN type, whereas if the connection occurs at the terminal $T_2$, the electronic circuit 41 can include MOSFET transistors of the P type or BJT transistors of the PNP type.

Preferably, the comparator circuit block 44 comprises a hysteresis comparator 46, which is suitable to receive in input a signal $V_{OUT1}$, indicative of the second unipolar voltage $V_{OUT}$ and a reference signal $V_{REF}$. The reference voltage $V_{REF}$ can be used to adjust the amplitude of the variation range of the voltage $V_{OUT}$.

Advantageously, the enabling circuit block 45 comprises one or more active electronic semiconductor devices $Q_2$ (for example of the previously described type), which are advantageously connected at the input terminal $T_1$ or $T_2$.

According to the embodiment shown in FIG. 3, the charge accumulation circuit 23 comprises one or more capacitive elements 51, which are advantageously connected between the output terminals $T_3$ and $T_4$ of the adjustment stage 24.

Preferably, the second electronic means 26 comprise a network of resistive elements 53 (elements $R_{F1}$ and $R_{F2}$), which is suitable to generate a feedback signal $V_F$, indicative of the value of the second current $I_{OUT}$. Advantageously, the second electronic means 26 also comprise one or more active semiconductor devices $Q_3$ (for example of the above described type) which are suitable to generate, according to the feedback signal $V_F$, a control signal $V_{COM}$ for the first electronic means 27. In particular, the active semiconductor devices 55 generate the control signal $V_{COM}$ (which can be an enable/disable signal) for the electronic interruption circuit 41.

Preferably, the third electronic means 28 comprise a network of capacitive and/or resistive elements (elements $R_{F3}$ and $C_{F3}$), which is connected between one of the output terminals ($T_3$ or $T_4$) and the first electronic means 27.

Figure 4:
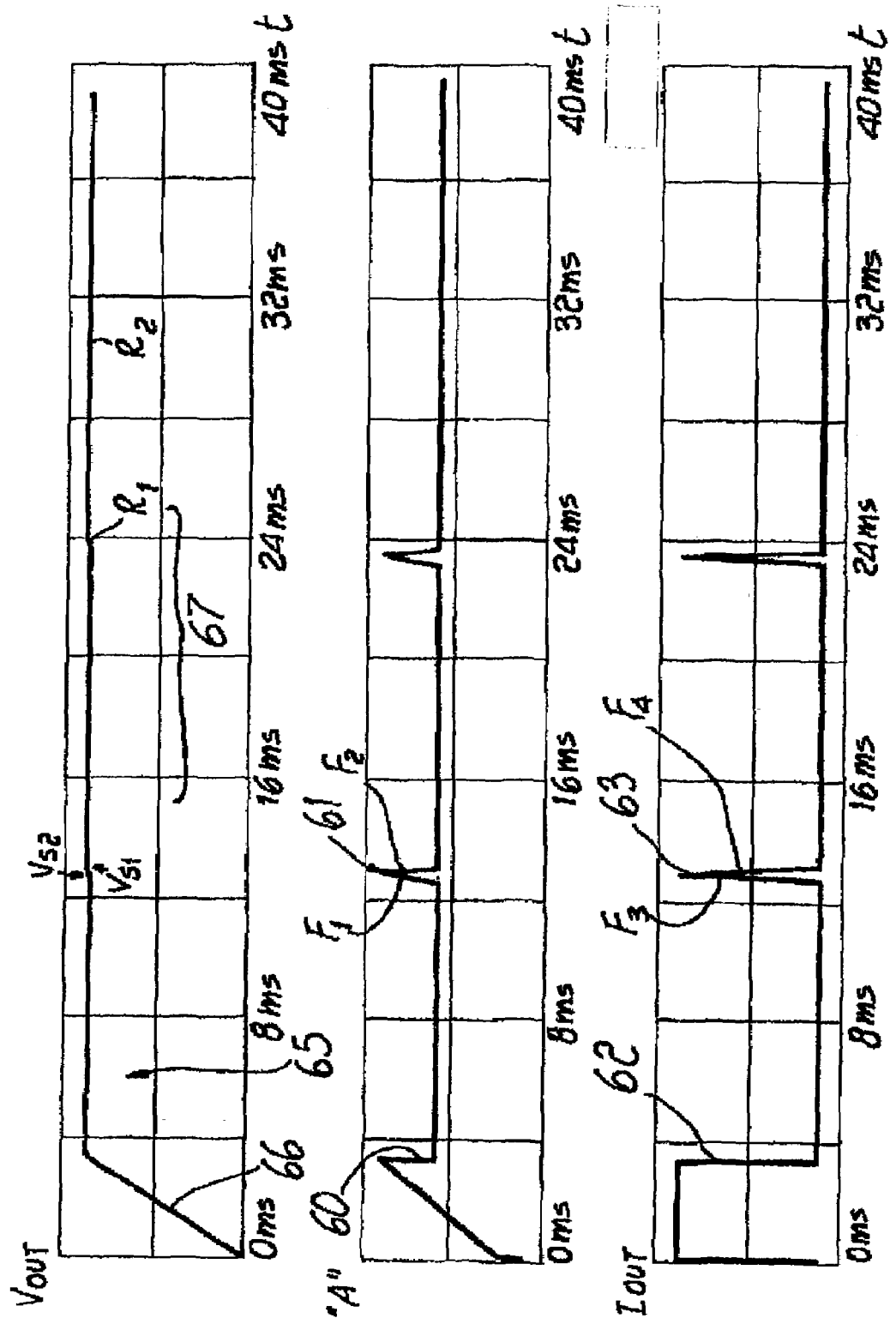
FIG. 4 plots schematically some currents and voltages in the embodiment of the power supply device, according to the present invention, shown in FIG. 3.

The waveforms of some voltages and currents inside the adjustment stage 24 are now illustrated schematically with reference to FIG. 4 in order to make easier to understand the operation of the preferred embodiment illustrated in FIG. 3.

With reference also to FIG. 4, the waveform 60 schematically plots the voltage related to the node "A" of the adjustment stage 24. The peaks 61, related to the waveform 60, represent the enable/disable signals $V_{AB}$ sent by the electronic enabling circuit 45. In particular, the rising/falling edges ($F_1$ and $F_2$) of each peak 61 respectively represent an enable/disable signal for the electronic interruption circuit 41.

The waveform 62 instead plots the second current $I_{OUT}$. It is clearly noticeable that at each peak 61 of the waveform 60 there is a current pulse 63 which is used to charge the charge accumulation circuit 23. The slope of the rising/falling edges $F_3$ and $F_4$ related to each current pulse 63 is adjusted by the third electronic means 28 by sending the feedback signal $V_{FREQ}$ to the first electronic means 27.

Considering the waveform 65, which plots the voltage $V_{OUT}$, it can be noted that the second current $I_{OUT}$ charges the charge accumulation circuit 23.

As shown, after an initial transient 66, the voltage $V_{OUT}$ can remain substantially constant by virtue of the action of the pulsed second current $I_{OUT}$, which keeps charged, by virtue of successive pulses 63, the charge accumulation circuit 23. When the voltage $V_{OUT}$ drops below a threshold value $V_{S1}$, a rising edge $F_1$ of the waveform 60 intervenes, causing the onset of the rising edge $F_3$ of the second current $I_{OUT}$, which reaches a value corresponding to the value of the first current $I_{IN}$. This causes a ramp-like increase $R_1$ of the voltage $V_{OUT}$. As soon as the voltage $V_{OUT}$ exceeds a threshold value $V_{S2}$, a rising edge $F_1$ of the waveform 60 intervenes and causes the onset of the rising edge $F_3$ of the second current $I_{OUT}$, which returns to zero. In this manner, the voltage $V_{OUT}$ decreases, according to an exponential behavior $R_2$, which corresponds to the natural discharge transient of the charge accumulation circuit 23.

The voltage $V_{OUT}$ therefore has a ripple 67 whose maximum value can be adjusted by acting on the reference voltage $V_{REF}$ of the hysteresis comparator 46.

In practice it has been found that the power supply device 20, according to the present invention, achieves the intended aim and objects.

In particular, the power supply device 20 allows to supply an electric power level, which is sufficient to supply electromagnetic release devices, including release devices having relatively high power consumption, while limiting power dissipation. An adjustment of the first current $I_{IN}$, for example according to a switching-type mode, allows to limit power dissipation only to the transients which correspond to a rising/falling edge $F_3$ and $F_4$ of each pulse 63 of the second current $I_{OUT}$. Moreover, by virtue of the adjustment of the first current $I_{IN}$, the steady-state condition of the voltage $V_{OUT}$ is possible after a relatively short transient period. Moreover, it has been found that the power supply device 20 can be realized in a relatively compact size. Furthermore, it has been found to be easy to manufacture, allowing achieving a considerable reduction in manufacturing costs, installation costs and operating costs. Owing to its flexibility and operating characteristics, the power supply device 20 has proved itself useful for very wide input voltage ranges.

The power supply device, according to the present invention, thus conceived is susceptible of numerous modifications and variations, all of which are within the scope of the inventive concept. All the details may furthermore be replaced with other technically equivalent elements. In practice, the materials used, so long as they are compatible with the specific use, as well as the dimensions, may be any according to the requirements and the state of the art.

The invention claimed is:

1. A power supply device for low-voltage electronic residual current circuit breakers, the device comprising:
    an electronic rectifier stage, which receives an input from a mains voltage and generates a first unipolar voltage and a first current; and
    an electronic adjustment stage, which receives an input from said electronic rectifier stage and which generates, as an output thereof, a second unipolar voltage having an adjustable value, wherein said electronic adjustment stage comprises:
    a current adjustment circuit which receives the first current and generates a second current as an output thereof; and
    a charge accumulation circuit which receives the second current as an input thereof;
    wherein the current adjustment circuit generates the second current to maintain said second unipolar voltage at a predefined adjustable value, said current adjustment circuit receiving, as an input, voltage control signals that actively adjust said first current according to a switching-type adjustment mode;

wherein said second current comprises a pulsed type current having an adjustable pulse, repetition period, and slopes of rising and falling edges, wherein the pulses of said second current are spaced by adjustable time intervals, the duration of said time intervals being a function of a desired maximum ripple of said second unipolar voltage.

2. The device of claim 1, further comprising a first feedback circuit between the second unipolar voltage and the current adjusting circuit.

3. The device of claim 2, wherein said first feedback circuit provides a control signal to the current adjusting circuit which increases a stability of said electronic adjustment stage.

4. The device of claim 1, further comprising a second feedback circuit between an input and an output of the current adjusting circuit.

5. The device of claim 1, wherein said current adjusting circuit actively adjusts said first current so as to generate a second current having an adjustable average value.

6. The device of claim 1, wherein the second unipolar voltage is obtained from an output of the charge accumulation circuit.

7. The device of claim 1, wherein the value of said second unipolar voltage depends on an average value of said second current.

8. A low-voltage electronic residual current circuit breaker, comprising the power supply of claim 1.

9. A power supply device for low-voltage electronic residual current circuit breakers, the device comprising:

an electronic rectifier stage, which receives an input from a mains voltage and generates a first unipolar voltage and a first current; and an electronic adjustment stage, which receives an input from said electronic rectifier stage and which generates, as an output thereof, a second unipolar voltage having an adjustable value, wherein said electronic adjustment stage comprises:

a current adjustment circuit which receives the first current and generates a second current as an output thereof; and a charge accumulation circuit which receives the second current as an input thereof; and wherein the current adjustment circuit generates the second current to maintain said second unipolar voltage at a predefined adjustable value; and an electronic interruption circuit which enables or interrupts said first current following reception of a respective enable or disable signal; and a comparator circuit which generates a control signal when said unipolar voltage changes above or below a preset range; and an enabling circuit which generates an enable or disable signal for said electronic interruption circuit responsive to a control signal from said comparator circuit;

wherein the current adjustment circuit generates the second current to maintain said second unipolar voltage at a predefined adjustable value, said current adjustment circuit receiving, as an input voltage, control signals that actively a just said first current according to a switching-type adjustment mode;

wherein said second current comprises a pulsed type current having an adjustable pulse, repetition period and slopes of the rising/falling edges; and wherein the pulses of said second current are spaced by adjustable time intervals, the duration of said time intervals being a function of a desired maximum ripple of said second unipolar voltage.

* * * * *